May 30, 1961  A. L. WILEY  2,986,232
DIGESTER SCREEN
Filed Jan. 24, 1958
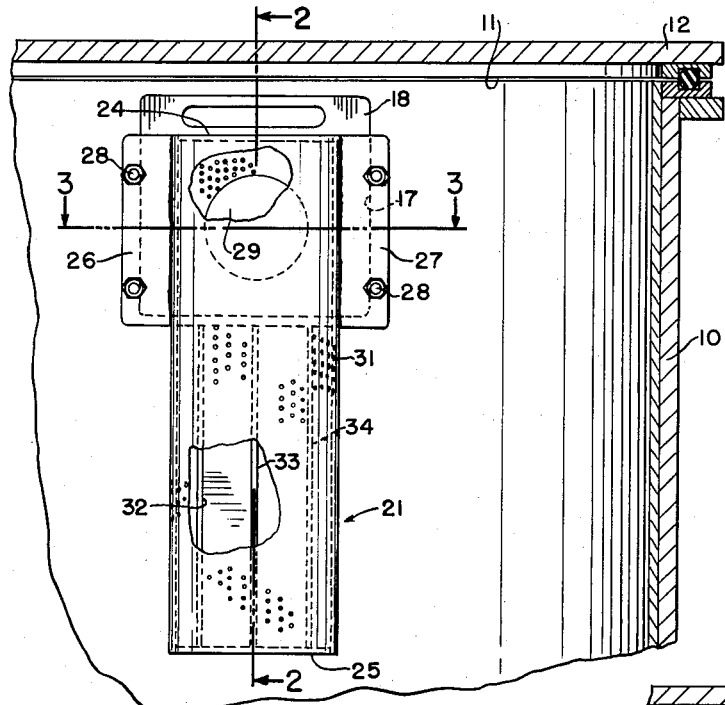
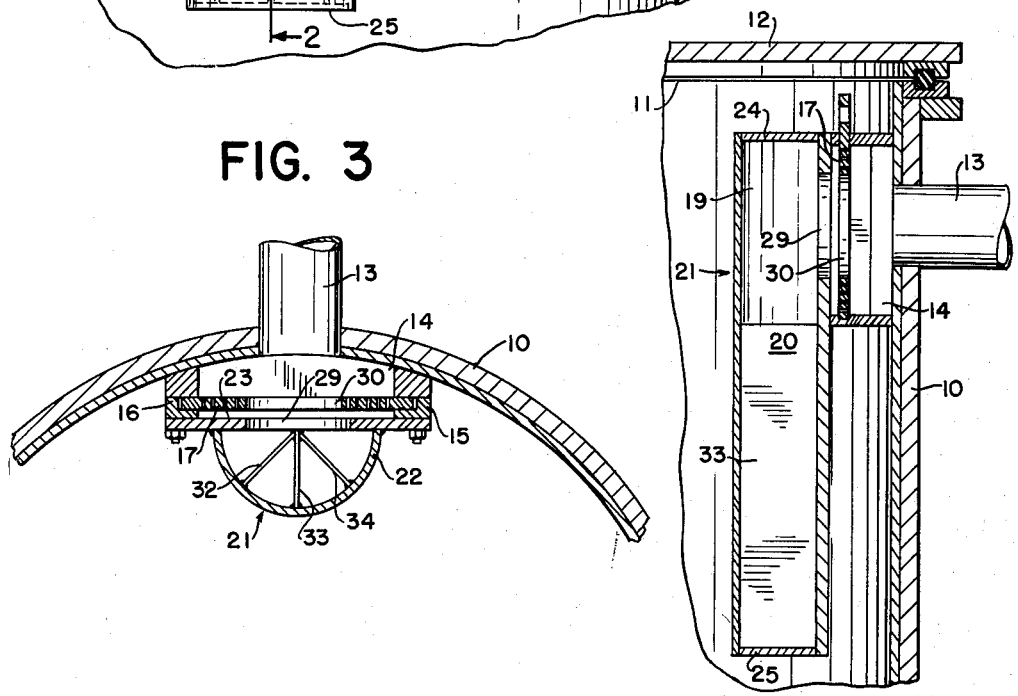
INVENTOR.
ALBERT L. WILEY
BY
Pennie, Edmonds, Morton, Barrows & Taylor
ATTORNEYS

# United States Patent Office 2,986,232
Patented May 30, 1961

2,986,232
DIGESTER SCREEN
Albert L. Wiley, Acme, N.C., assignor to Riegel Paper Corporation, New York, N.Y., a corporation of Delaware
Filed Jan. 24, 1958, Ser. No. 710,899
7 Claims. (Cl. 183—44)

The present invention relates to pulp digesters and the like, and more particularly to a novel and improved screen for the gas outlet of a pressurized vessel, such as a digester, providing for the ready escape of gases while effectively preventing the entrainment of solid matter, such as wood fibers, in the outflowing gas stream.

In a conventional pulp digester, for example, provision is made for introducing into a large vessel, forming the body of the digester, a quantity of cooking liquor, along with a charge of wood chips. Steam is introduced into the vessel, to provide heat and pressure for cooking, and provision is made for the removal of gas from the upper portion of the vessel.

As a general rule, wood fibers in the digester tend to become entrained in the gas withdrawn from the digester, and it is common practice to provide a screen over the gas outlet to prevent the outflow of solids. However, the screens inevitably become clogged with the fibrous wood matter and have to be cleared periodically to permit proper gas removal.

Various practices have been proposed heretofore for clearing the screens of the wood fibers, and probably the most effective and most widely used of these practices involves periodically discharging high pressure compressed air or steam into the digester, through the gas outlet and screen, in a reverse direction. Insofar as I am aware, however, such practices have not been entirely satisfactory, in that the size and shape of the screen is such that it must be cleared with excessive frequency and/or is difficult to clear effectively with conventional facilities.

The present invention obviates many of the difficulties experienced with prior apparatus by providing a gas outlet screen of novel and improved design, having a large flow area for the passage of outflowing gases and having improved arrangements for clearing the screen periodically of solid matter, with otherwise conventional clearing facilities and practices. More specifically, the invention provides a gas outlet screen for a digester or the like, which has a large effective screen area, in relation to the size of the gas outlet, and which includes means forming flow passages or chambers of relatively small size to direct the flow of high pressure clearing air or steam substantially uniformly through all parts of the screen area, so that the entire screen may be efficiently cleared from time to time, as necessary.

In general, the improved screen comprises a chamber, having a perforate side wall, which is offset from the gas outlet of the digester and has an open end through which the chamber communicates with the outlet. The chamber is elongated to provide substantial perforate side wall area, through which the outflowing gases may readily pass, and the chamber is divided into a plurality of sub-chambers, each communicating at its end with the gas outlet. The sub-chambers promote the efficient flow of gases out of the digester during normal operation thereof and insure substantially uniform distribution of the high pressure clearing air or steam, when the screen is periodically cleared, so that all areas of the screen are effectively cleared.

A more specific aspect of the invention resides in the provision of a screen for the outlet of a digester or the like which may be economically manufactured and readily installed in existing digester facilities, and which is confined close to the side wall of the digester so as not to interfere with the introduction of wood chips and/or liquor through the top of the digester.

For a better understanding of the invention, reference should be made to the following detailed description and to the accompanying drawing, in which:

Fig. 1 is a fragmentary, cross sectional view of a pulp digester incorporating the improved screen of the invention; and Figs. 2 and 3 are fragmentary, cross sectional views taken generally along lines 2—2 and 3—3 respectively of Fig. 1.

Referring now to the drawing, the reference numeral 10 designates generally a vessel, such as a pulp digester, which may be of conventional construction. The digester 10, which is usually in the form of an upright, generally cylindrical container, is provided with an open top 11, normally closed by a removable cover 12.

In accordance with general practice, the digester 10 is readied for operation by introducing a predetermined quantity of wood chips through the open top 11, and a predetermined volume of cooking liquor is introduced to fill the digester to a desired level. When the digester is loaded and sealed, steam is introduced into the liquor, by suitable conventional means (not shown) to provide heat and pressure.

In order to remove various gases produced in the cooking operation, and to help control the pressure within the digester, it is conventional to provide a gas outlet 13, adjacent the top of the digester and above the level of the liquor. The outlet 13 may comprise a suitable discharge pipe, which opens within the digester, as best shown in Figs. 2 and 3.

During the cooking operation, the mixture of liquor and wood chips or fibers is violently agitated by the inflowing steam, so that solid matter tends to become entrained in the gases being discharged through the gas outlet 13. Accordingly, it is common practice to provide a screen over the opening of the outlet 13 to permit the flow of gases while barring the passage of wood fibers and other solid matter.

One conventional form of gas outlet screen comprises a box-like chamber 14 having an outer frame 15 bolted thereto and defining a pair of vertical slots or tracks 16. The tracks 16 are adapted slidably to receive a rectangular screen 17, which may be a metal plate provided with a plurality of perforations or openings covering substantially its entire center area. The screen 17 may be provided with a projecting upper portion 18, forming a handle, by means of which the screen may be engaged for removal.

The foregoing arrangement being purely conventional, the present invention provides an improved screen arrangement which may be incorporated in the conventional structure with a minimum of alteration, as set forth in detail below, it being understood, of course, that this is merely a collateral advantage, as the new screen may be incorporated in new digester apparatus or in existing apparatus having other outlet screen arrangements. Thus, the new screen comprises a pair of chambers 19, 20 communicating with each other at their ends, and advantageously, the chambers 19, 20 are part of a single housing 21 formed of a semi-cylindrical front plate 22, a flat back plate 23 and end plates 24, 25. The housing thus formed is of semi-cylindrical cross section, and in a typiical installation the housing may be in the order of 28 inches in length, having a front wall radius of 3 inches.

As shown best in Figures 1 and 3, the back plate 23 of the housing has a generally T-shaped outline, forming a pair of arms 26, 27 which project outwardly from each side of the housing, adjacent its upper end. And, where the digester installation is provided with a screen assembly of the conventional type described above, the size and shape of the arms 26, 27 may be such that the upper end of the back plate 23 covers the end of the box-like chamber 14 and may be fastened conveniently to the frame 15, by means of a plurality of bolts 28 engaging the projecting arms 26, 27.

In order to provide communication between the interior of the housing 21 and the gas outlet 13, the back plate 23 is provide, adjacent its upper end, with an opening 29 exposed to the chamber 14. In the illustrated apparatus, a similar opening 30 is also formed in the screen 17 of the conventional outlet arrangement, so that a straight-through passage is provided between the interior of the housing 21 and the outlet 13. In many instances, of course, the conventional screen 17 will simply be removed from the assembly, in which case the opening provided for the screen in the top of the frame 15 is closed off. However, in many cases it is simpler and involves less installation expense to merely cut the opening 30 in the screen 17, rendering it ineffective as a screen but allowing it to remain in position to close off the top opening otherwise made by its absence.

In accordance with the invention, the chamber 19 of the housing 21 is in communication with the gas outlet 13 and has imperforate walls. The chamber 20 communicates at its end with an end of the chamber 19 and has a perforate front wall. By way of illustration, in a housing of 28 inches in length, the chamber 19 may be in the order of 7 inches in length while the chamber 20 may be in the order of 21 inches in length. The portion of the semi-cylindrical front plate 22 which forms the front of the chamber 20 is provided substantially throughout its exposed area, approximating, in the illustrated apparatus, 190 square inches, with closely spaced openings 31. By way of example, the openings 31 may be 3/16 of an inch in diameter, spaced on 3/8 of an inch centers. The arrangement is such that gas may flow readily through the perforate portion of the front plate and into the chamber 20. The gas then flows longitudinally through the housing 21, into the chamber 19, and thence through the outlet 13.

In an apparatus of the size and type illustrated herein, the gas outlet 13 may be a four-inch pipe, having a passage area in the order of 12 square inches. Accordingly, the perforate surface area provided by the front wall of the chamber 20 is of such size, in relation to the passage area of the gas outlet, as to promote the low velocity flow of gas into the chamber 20 and reduce the tendency of the solid fibers and other matter to become entrained in the outflowing gas.

As a general rule, the openings 31 in the perforate wall of the chamber 20 will become clogged with solid matter after an extended period of use and it will be necessary to clear the openings to enable the cooking operation to continue in the desired manner. The present invention contemplates that clearing of the openings will be accomplished by the reverse flow, through the gas outlet, of high pressure compressed air, steam, or other gas, and, to this end, the apparatus of the invention incorporates means for promoting the effective clearing of the entire screen area defined by the perforate portion of the front plate 22. Thus, as shown best in Figs. 1 and 3, the chamber 20 is provided with a plurality of vanes 32—34, which extend generally parallel to the longitudinal axis of the housing 21 and are disposed radially with respect to the semi-cylindrical front plate 22 thereof. The vanes 32—34 are coextensive in length with the chamber 20 and serve to divide the chamber into a plurality of sub-chambers of wedge-shaped cross section. Each of the sub-chambers formed by the vanes 32—34 communicates at its end with the chamber 19, but the chambers are otherwise independent of each other.

During normal operation of the apparatus, gas flowing from the interior of the digester to the outlet 13 will flow into the several sub-chambers of the chamber 20 and will be discharged in independent streams in the chamber 19, where a single flow stream will be formed. This promotes uniform flow of the gas through the perforate portion of the plate 22, over the entire area thereof, and thereby avoids localized high velocity gas flow and reduces the tendency of the openings 31 to become clogged with fibrous matter. Of perhaps greater importance, however, is the function of the dividing vanes 32—34 during clearing of the screen. Thus, when high pressure compressed air, steam, etc., is discharged into the chamber 19 from the gas outlet 13, the flow is divided and directed in independent streams into the several sub-chambers of the chamber 20. The clearing air is thereby caused to flow with substantial uniformity through the entire perforate area of the front plate 22, assuring maximum effectiveness in clearing the screen.

The new screen is advantageous in that it provides significantly increased efficiency in the operation of pulp digesters, for example, by the combined action of reducing the normal tendency for the screen to become clogged with fibrous matter and increasing the speed and effectiveness with which the screen may be cleared. Another important practical advantage is that the screen assembly may be incorporated readily into existing digester equipment, as well as in new installations. Moreover, the physical design of the new screen is such that it may be economically fabricated and, when installed, is confined close to the side wall of the digester to facilitate the introduction of wood chips or other matter through the top of the vessel.

It should be understood, however, that the specific device herein illustrated and described is intended to be representative only, as certain changes may be made therein without departing from the clear teachings of the invention. Accordingly, reference should be made to the following appended claims in determining the full scope of the invention.

I claim:

1. A strainer for the gas-off exit of a digester or like vessel containing gas under pressure and solid particles entrained therein comprising a first chamber disposed adjacent the side wall of the vessel and communicating with a gas outlet for the vessel, said chamber having one of its ends open, a second chamber communicating with the open end of the first chamber and disposed in offset relation to said gas outlet, said second chamber being exposed directly to the gas and the entrained particles, said second chamber having a perforate wall to form a strainer providing for the flow of gases into the second chamber from the interior of the vessel and the separation of gases from the entrained particles, the perforations in said second chamber being generally of a size smaller than the entrained particles in said vessel, said first and second chambers being formed by an elongated housing, said housing having an opening in the side wall thereof connecting the first chamber with the gas outlet, said housing being of generally semi-cylindrical cross section and having a flat wall facing the adjacent wall of the vessel and a generally semi-cylindrical wall facing the interior of the vessel, the semi-cylindrical wall being provided with perforations for the passage of gas.

2. A strainer for the gas-off exit of a digester or like vessel containing gas under pressure and solid particles entrained therein comprising a first chamber disposed adjacent the side wall of the vessel and communicating with a gas outlet for the vessel, said chamber having one of its ends open, a second chamber communicating with the open end of the first chamber and disposed in offset relation to said gas outlet, said second chamber being exposed directly to the gas and the entrained particles, said second chamber having a perforate wall to form a strainer providing for the flow of gases into the second chamber from the interior of the vessel and the separation of gases from the entrained particles, the perforations in said second chamber being generally of a size smaller than the entrained particles in said vessel, said first and second chambers being formed by an elongated housing, said housing having an opening in the side wall thereof connecting the first chamber with the gas outlet, said second chamber being provided with a plurality of vanes disposed in generally parallel relation to the axis of the elongated housing and dividing the second chamber into sub-chambers disposed along the axis.

3. A strainer for the gas-off exit of a digester or like vessel containing gas under pressure and solid particles entrained therein comprising a first chamber disposed adjacent the side wall of the vessel and communicating with a gas outlet for the vessel, said chamber having one of its ends open, a second chamber communicating with the open end of the first chamber and disposed in offset relation to said gas outlet, said second chamber being exposed directly to the gas and the entrained particles, said second chamber having a perforate wall to form a strainer providing for the flow of gases into the second chamber from the interior of the vessel and the separation of gases from the entrained particles, the perforations in said second chamber being generally of a size smaller than the entrained particles in said vessel, said first and second chambers being formed by an elongated housing, said housing having an opening in the side wall thereof connecting the first chamber with the gas outlet, said housing comprising a flat back plate and a generally semi-cylindrical front plate, said front plate being provided with perforations for the passage of gas.

4. The strainer of claim 3, in which vanes are disposed longitudinally in the housing and extend substantially throughout the length of the second chamber, and the vanes are substantially radially disposed with respect to the semi-cylindrical front plate, the second chamber being thereby divided into a plurality of longitudinally disposed wedge-shaped sub-chambers.

5. The strainer of claim 3, in which the back plate is generally T-shaped and has arms extending outwardly from each side of the front plate, and the housing is secured to the vessel by fasteners engaging said arms.

6. A strainer for the gas-off exit of a digester or like vessel containing gas under pressure and solid particles entrained therein comprising a first chamber disposed adjacent the side wall of the vessel and communicating with a gas outlet for the vessel, said chamber having one of its ends open, a second chamber communicating with the open end of the first chamber and disposed in offset relation to said gas outlet, said second chamber being exposed directly to the gas and the entrained particles, said second chamber having a perforate wall to form a strainer providing for the flow of gases into the second chamber from the interior of the vessel and the separation of gases from the entrained particles, the perforations in said second chamber being generally of a size smaller than the entrained particles in said vessel, said chambers being formed by a vertically elongated housing, said second chamber being disposed below the first chamber.

7. The strainer of claim 6, in which the second chamber is divided into a plurality of sub-chambers, and each of the sub-chambers communicates independently with the first chamber.

References Cited in the file of this patent

UNITED STATES PATENTS

| Number | Name | Date |
|---|---|---|
| 435,990 | White | Sept. 9, 1890 |
| 1,073,883 | Aikman | Sept. 23, 1913 |
| 2,083,764 | Weisgerber | June 15, 1937 |
| 2,244,843 | Lofgren | June 10, 1941 |
| 2,451,073 | Cowherd | Oct. 12, 1948 |

FOREIGN PATENTS

| Number | Country | Date |
|---|---|---|
| 121,574 | Switzerland | of 1926 |
| 427,468 | Germany | Apr. 9, 1926 |
| 664,042 | Great Britain | Jan. 2, 1952 |